US010205354B2

United States Patent
Cho et al.

(10) Patent No.: US 10,205,354 B2
(45) Date of Patent: Feb. 12, 2019

(54) BRUSHLESS MOTOR HAVING A STATOR WITH TEETH SHAPED TO REDUCE COGGING TORQUE

(71) Applicant: Hanon Systems, Daejeon (KR)

(72) Inventors: Seong Kook Cho, Daejeon (KR); Eun Seok Kang, Daejeon (KR); Ho Bin Im, Daejeon (KR); Kyung Hun Jung, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 541 days.

(21) Appl. No.: 14/887,766

(22) Filed: Oct. 20, 2015

(65) Prior Publication Data

US 2016/0197525 A1 Jul. 7, 2016

(30) Foreign Application Priority Data

Aug. 25, 2014 (KR) .................. 10-2014-0110997
Aug. 25, 2015 (KR) .................. 10-2015-0119247

(51) Int. Cl.
*H02K 1/06* (2006.01)
*H02K 1/14* (2006.01)
*H02K 29/03* (2006.01)

(52) U.S. Cl.
CPC .............. *H02K 1/146* (2013.01); *H02K 1/06* (2013.01); *H02K 29/03* (2013.01); *H02K 2213/03* (2013.01)

(58) Field of Classification Search
CPC .......... H02K 1/06; H02K 1/146; H02K 29/03; H02K 2213/03

USPC ......... 310/60 R, 216.091, 216.092, 216.093, 310/216.097
See application file for complete search history.

(56) References Cited

U.S. PATENT DOCUMENTS

| 5,047,682 A * | 9/1991 | Burgbacher | H02K 29/03 310/216.091 |
| 6,166,474 A * | 12/2000 | Kohara | H02K 1/148 29/596 |
| 6,313,558 B1 * | 11/2001 | Abukawa | H02K 29/03 310/429 |
| 7,615,898 B2 * | 11/2009 | Chang | F04D 25/088 310/58 |
| 9,876,400 B2 * | 1/2018 | Do | H02K 1/24 |

(Continued)

FOREIGN PATENT DOCUMENTS

| CN | 201985634 U | 9/2011 |
| DE | 19939061 A1 | 3/2000 |

(Continued)

*Primary Examiner* — Bernard Rojas
*Assistant Examiner* — Rashad H Johnson
(74) *Attorney, Agent, or Firm* — Shumaker, Loop & Kendrick, LLP; James D. Miller (57) ABSTRACT

A brushless motor includes a rotor in which permanent magnets are provided on an inner circumferential surface of a rotor core, and a stator in which teeth are provided on respective ends of stator cores around each of which a coil is wound. Each of the teeth is formed such that the distance between a facing surface which faces the permanent magnet and an inner circumferential surface of the permanent magnet is increased from the center of the tooth to the end thereof. Therefore, the rate of variation in magnetic resistance in response to variation in position of the rotor can be minimized, whereby cogging torque can be markedly reduced.

13 Claims, 7 Drawing Sheets

(56) References Cited

U.S. PATENT DOCUMENTS

| | | | |
|---|---|---|---|
| 2003/0107290 A1* | 6/2003 | De Filippis | H02K 1/146 310/216.008 |
| 2004/0056555 A1* | 3/2004 | Fujinaka | H02K 21/22 310/216.091 |
| 2005/0285471 A1 | 12/2005 | Chen et al. | |
| 2011/0148239 A1 | 6/2011 | Nakamura et al. | |
| 2013/0119796 A1* | 5/2013 | Maeda | H02K 9/06 310/63 |
| 2017/0018980 A1* | 1/2017 | Yang | H02K 21/14 |

FOREIGN PATENT DOCUMENTS

| | | |
|---|---|---|
| DE | 69726547 T2 | 11/2004 |
| DE | 102009048116 A1 | 4/2011 |
| JP | 61120245 U | 7/1986 |
| KR | 61120245 U | 7/1986 |
| KR | 20050006040 A | 1/2005 |
| KR | 20090132219 A | 12/2009 |

* cited by examiner

BRUSHLESS MOTOR HAVING A STATOR WITH TEETH SHAPED TO REDUCE COGGING TORQUE

CROSS-REFERENCE TO RELATED APPLICATIONS

This application claims priority to Korean Patent Application Serial No. 10-2014-0110997 filed Aug. 25, 2014 and Korean Patent Application Serial No. 10-2015-0119247 filed Aug. 25, 2015, hereby incorporated herein by reference in their entirety.

BACKGROUND OF THE INVENTION

Field of the Invention

Exemplary embodiments of the present invention relate to a brushless motor, and more particularly, to a brushless motor in which a rotor is rotated around a stator and a permanent magnet is provided on the rotor.

Background of the Invention

Generally, a motor is a device which converts electric energy into mechanical energy in a magnetic field in which electric current flows. Motors can be classified into various types depending on a variety of criteria such as the kind of power, the positions of a rotor and a stator, whether a permanent magnet is present or not, etc.

For example, motors may be classified into a direct current (DC) motor and an alternating current (AC) motor according to the kind of power. DC motors are also classified into a brushed motor and a brushless motor.

A brushed motor of DC motors allows current to flow through a coil by means of contact between a commutator and a brush and has a function of commutating the current, but it is disadvantageous in that mechanical or electrical noise is generated and the brush is worn. In an effort to overcome the above-mentioned disadvantages, BLDC (brushless DC) motors having no brush have been widely used. Such a BLDC motor is a DC motor that has neither brush nor commutator but includes an electronic commutation unit, and is also called a commutatorless motor.

Figure 1:
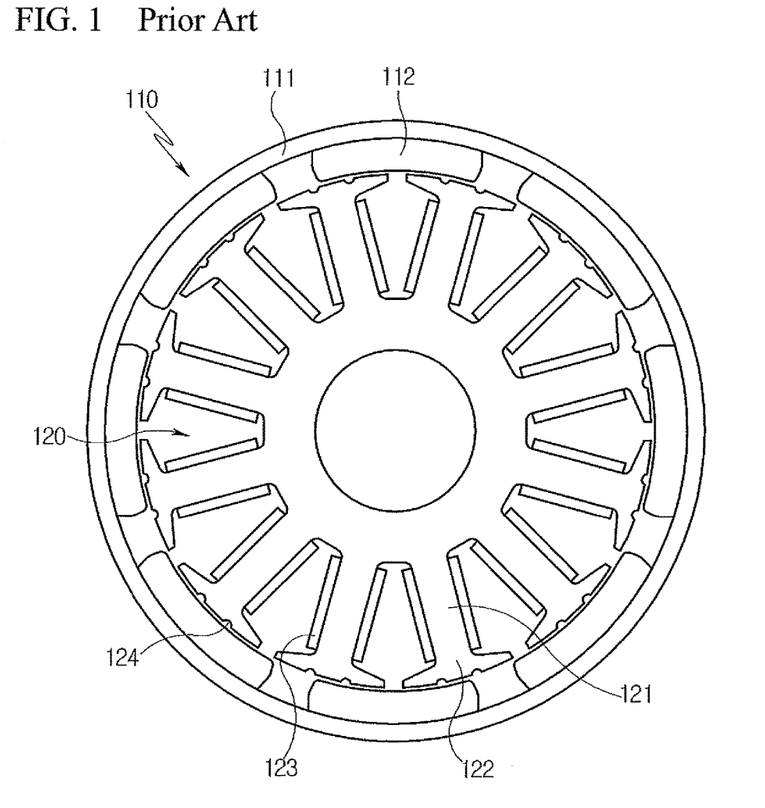
FIG. 1 is a cross-sectional view illustrating a brushless motor according to a conventional technique.
Figure 2:
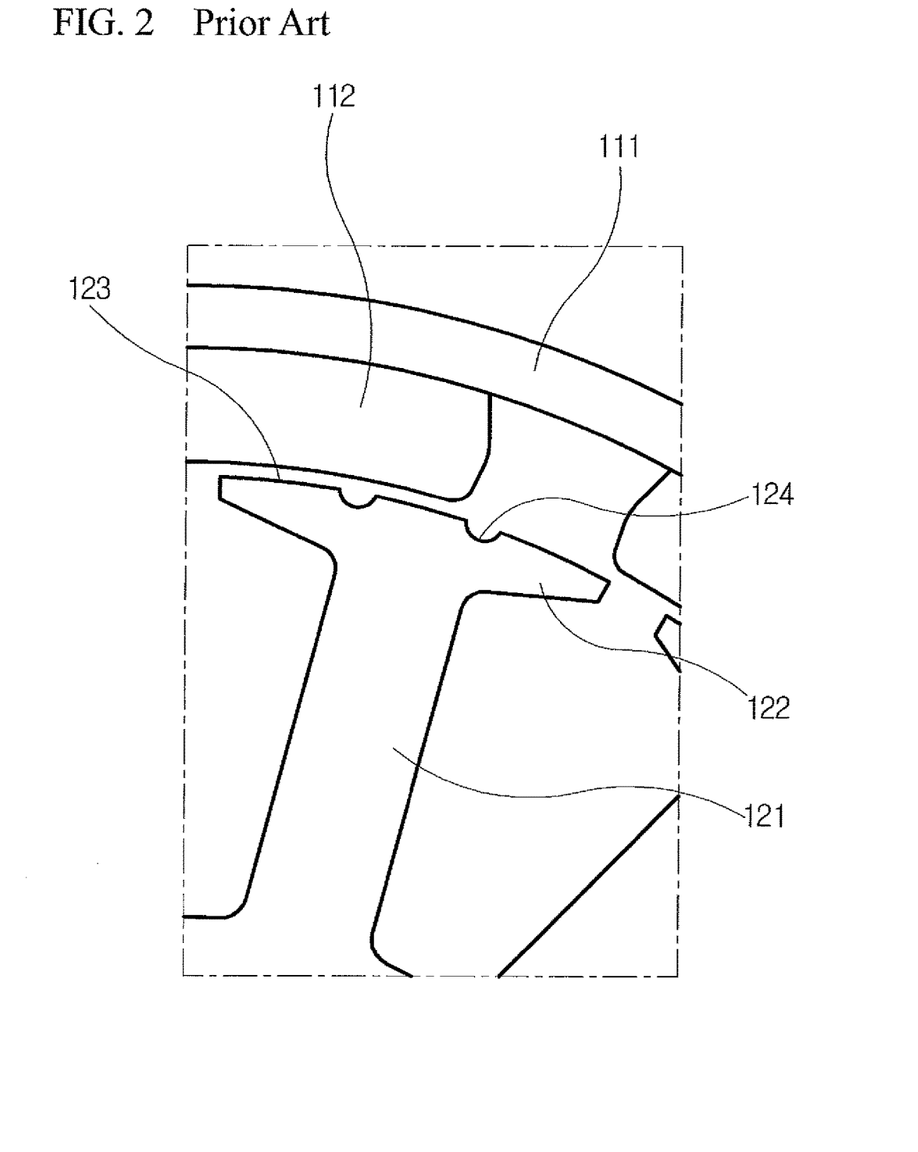
FIG. 2 is a partial enlarged view of the brushless motor shown in FIG. 1.

Furthermore, motors may be classified into an inner-rotor motor and a brushless motor according to a relative position of a rotor and a stator. FIGS. 1 and 2 illustrate an example of a BLDC motor.

A BLDC motor illustrated in FIGS. 1 and 2 includes a rotor 110 in which permanent magnets 112 are provided on the inner circumferential surface of a rotor core 111, and a stator 120 in which teeth 122 are provided on outer ends of respective stator cores 121 around each of which a coil 125 is wound.

Meanwhile, when the motor rotates, the magnitude of magnetic resistance, which impedes the flow of magnetic flux, varies depending on the position of the rotor 110. Due to such variation in magnetic resistance, torque ripple is caused. As such, torque generated when the rotor rotates before power is applied to the coil refers to cogging torque. Such cogging torque results in vibration and noise.

The magnitude of cogging torque is known as being proportional to a rate of variation in magnetic resistance in response to variation in position of the rotor. To reduce such cogging torque, in each of the teeth 122 according to the conventional technique shown in FIGS. 1 and 2, a notch 124 is formed in a facing surface 123 that faces the permanent magnet 112.

Each of the teeth 122 is an element which extends in the circumferential direction of the rotor core 111 such that magnetic flux of the stator 120 is transferred to the rotor 110. A plurality of notches 124 are formed in the facing surface 123 of each tooth 122 and arranged in the circumferential direction of the rotor core 111.

Figure 5:
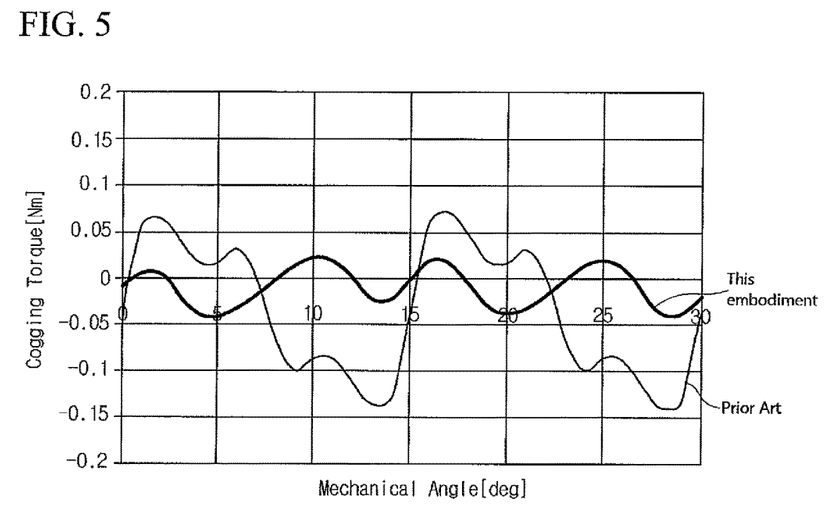
FIG. 5 is a graph showing a cogging torque reduction effect of the brushless motor according to the embodiment of the present invention.

However, even through the notches 124 are formed in each tooth 122, as shown in FIG. 5, the variation rate of the magnetic resistance in response to the rotation angle of the rotor is still comparatively large. Thus, there is a problem in that noise and vibration cannot be satisfactorily reduced.

SUMMARY OF THE INVENTION

Accordingly, the present invention has been made keeping in mind the above problems occurring in the conventional brushless motor, and an object of the present invention is to a brushless motor which minimizes a rate of variation in magnetic resistance in response to variation in position of a rotor, thus markedly reducing cogging torque.

In accordance with one aspect of the present invention, a brushless motor includes a rotor in which a permanent magnet is provided on an inner circumferential surface of a rotor core, and a stator in which a tooth is provided on an end of a stator core around which a coil is wound, wherein the tooth is formed such that a distance between a facing surface which faces the permanent magnet and an inner circumferential surface of the permanent magnet is increased from a center of the tooth to an end thereof.

In the brushless motor in accordance with an aspect of the present invention, the tooth may extend in a circumferential direction of the rotor core.

In the brushless motor in accordance with another aspect of the present invention, the facing surface of the tooth may have a planar shape and be formed to be inclined such that the facing surface forms a predetermined angle relative to a tangent at a point at which the inner circumferential surface of the permanent magnet and a center line of the stator core intersect each other.

In the brushless motor in accordance with another aspect of the present invention, the angle between the facing surface of the tooth and the tangent may satisfy $3° \leq \alpha \leq 20°$.

In the brushless motor in accordance with another aspect of the present invention, the facing surface of the tooth may be symmetrical based on the center line of the stator core.

In the brushless motor in accordance with another aspect of the present invention, a top surface part having a shape different from the shape of the facing surface may be formed on the facing surface of the tooth and extend from the center line of the stator core in opposite directions.

Preferably, a length (L1) of the top surface part relative to a length (L2) from the center line of the stator core to the end of the facing surface may satisfy $$0 < \frac{L1}{L2} < \frac{1}{4}.$$

In the brushless motor in accordance with another aspect of the present invention, the inner circumferential surface of the permanent magnet may have a concave curved shape, and the facing surface of the tooth may have a planar shape.

In the brushless motor in accordance with another aspect of the present invention, a top surface part (24) having a shape different from the shape of the facing surface (23) may be formed on the facing surface (23) of the tooth (22) and extend from the center line (C) of the stator core (21) in opposite directions, and a length (L1) of the top surface part (24) may satisfy 0 mm≤L1≤2 mm.

In the brushless motor in accordance with another aspect of the present invention, the facing surface (23) of the tooth (22) may have a sharp edge (P) protruding toward the permanent magnet (12) at the center line (C) of the stator core (21).

In the brushless motor in accordance with another aspect of the present invention, when a distance between the facing surface (23) and the permanent magnet (12) at the center line (C) is denoted by d1 and a distance between the facing surface (23) and the permanent magnet (12) at the end of the facing surface (23) is denoted by d2, relationship of d1<d2 may be satisfied.

In the brushless motor in accordance with another aspect of the present invention, a top surface part (24) having a shape different from the shape of the facing surface (23) may be formed on the facing surface (23) of the tooth (22) and extend from the center line (C) of the stator core (21) in opposite directions, wherein the top surface part (24) may have a planar shape perpendicular to the center line (C).

In the brushless motor in accordance with another aspect of the present invention, a top surface part (24) having a shape different from the shape of the facing surface (23) may be formed on the facing surface (23) of the tooth (22) and extend from the center line (C) of the stator core (21) in opposite directions, wherein the top surface part (24) may have a curved shape having the same curvature as that of the permanent magnet (12) facing the top surface part (24).

In the brushless motor in accordance with another aspect of the present invention, the rotor may be rotatably disposed outside the stator with respect to a radial direction of the stator.

The brushless motor in accordance with another aspect of the present invention may further include a cooling fan coupled to the rotor. That is, the brushless motor may function as a means for driving the cooling fan. Here, the cooling fan may include a plurality of blades which are integrally formed with the rotor or coupled to the rotor.

In the brushless motor in accordance with another aspect of the present invention, the rotor may be mounted to a hub of the cooling fan. That is, because the rotor is installed outside the stator with respect to the radial direction of the stator, the rotor may be installed inside the hub of the cooling fan, in other words, inside the blades with respect to the radial direction of the blades.

DESCRIPTION OF THE DRAWINGS

The above and other objects, features and other advantages of the present invention will be more clearly understood from the following detailed description taken in conjunction with the accompanying drawings, in which.

WRITTEN DESCRIPTION OF THE INVENTION

Hereinafter, exemplary embodiments of the present invention will be described in detail with reference to the attached drawings.

Figure 3:
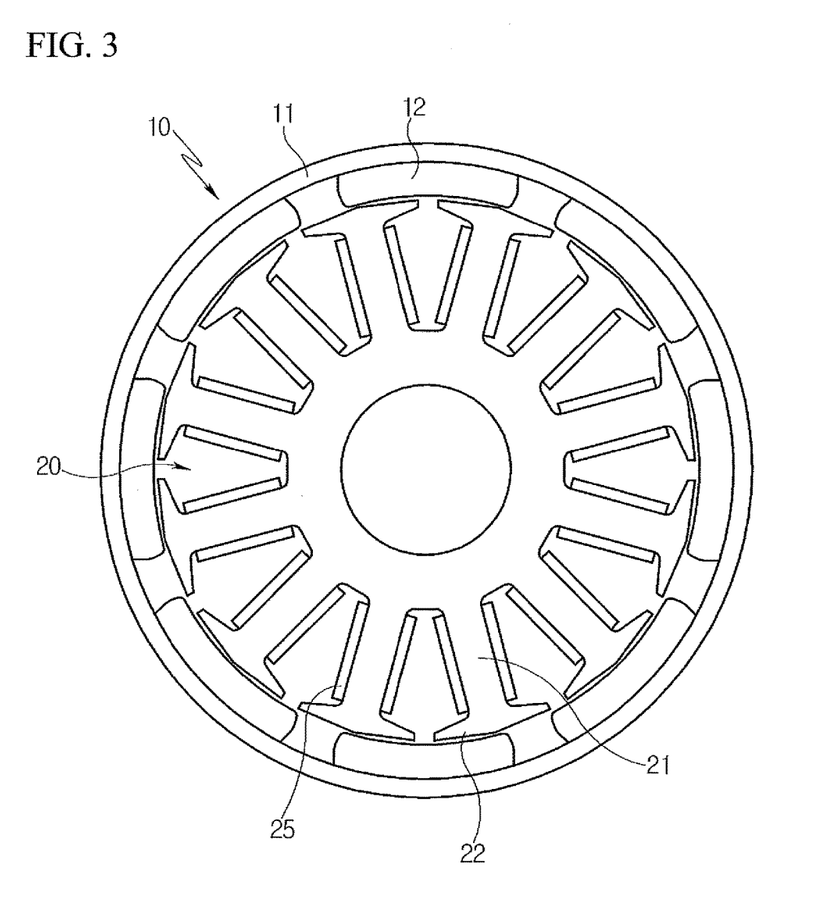
FIG. 3 is a cross-sectional view illustrating a brushless motor according to an embodiment of the present invention.
Figure 4:
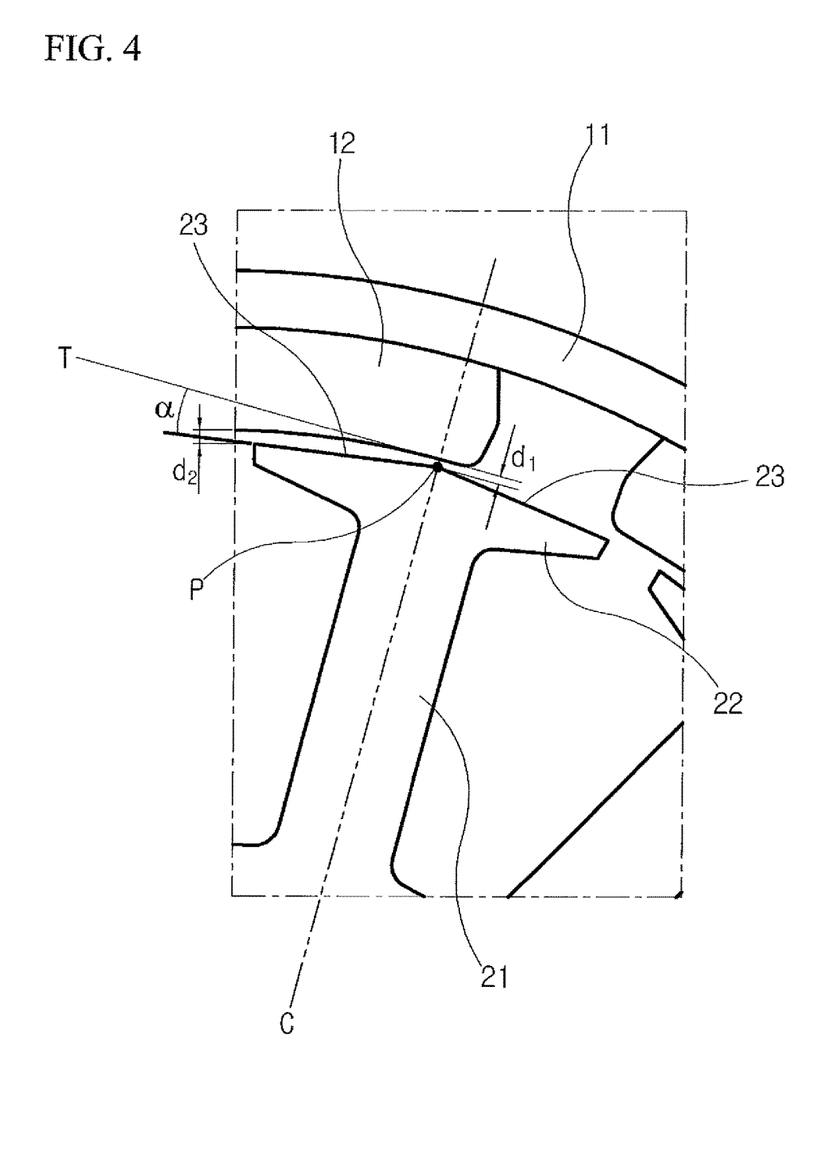
FIG. 4 is a partial enlarged view of the brushless motor shown in FIG. 3.

Referring to FIGS. 3 and 4, a brushless motor according to an embodiment of the present invention includes a rotor 10 in which permanent magnets 12 are provided on an inner circumferential surface of a rotor core 11, and a stator 20 in which teeth 22 are provided on respective outer ends of stator cores 21 around each of which a coil 25 is wound.

Each of the teeth 22 extends in a circumferential direction of the rotor core 11.

Each of the teeth 22 is configured such that the distance between each of facing surfaces 23 that face the permanent magnet 12 and an inner circumferential surface of the permanent magnet 12 is increased from the center of the tooth 22 to opposite ends thereof.

The facing surfaces 23 of the tooth 22 are formed to be symmetrical with each other based on a center line C of the corresponding stator core 21 in such a way that the tooth 22 generally has an inverted triangular shape.

$$T_C = -\frac{1}{2}\phi_g^2 \frac{dR}{d\theta}$$

where,
Φ: magnetic flux
R: magnetic resistance
θ: positional value of rotor

It can be understood from the above formula that the cogging torque (Tc) is proportional to a variation rate (dR) of magnetic resistance.

In the case of the tooth 22 of the conventional technique shown in FIG. 2, the distance between each facing surface 23 and the permanent magnet 12 is constant. Thus, in sections in which the permanent magnets 12 are present, there is no variation in magnetic resistance. However, in sections in which there is no permanent magnet, the magnetic resistance is rapidly reduced. Therefore, the variation rate (dR) of the magnetic resistance cannot help but be large.

In the case of each of the teeth 22 in accordance with the present invention, each facing surface 23 is formed to be inclined in such a way that the distance to the permanent magnet 12 is gradually increased from the center of the tooth 22 to the corresponding end thereof. When the distance between the facing surface 23 and the permanent magnet 12 at the center line C is denoted by d1 and the distance between the facing surface 23 and the permanent magnet 12 at the end of the facing surface 23 is denoted by d2, the facing surface 23 is formed such that the relationship of d1<d2 is satisfied. Thus, the distance between the permanent magnet 12 and the facing surface 23 is minimum at the center line C. Two straight lines that define the respective facing surfaces 23 intersect each other at the center line C, thus forming a sharp edge P. In other words, as shown in FIG. 4, the sharp edge P is formed on the center line C.

Consequently, the magnetic resistance is gradually reduced from the center of the tooth 22 to the opposite ends thereof, whereby a difference between the magnetic resistance value on the opposite ends of the tooth 22 and the magnetic resistance value in each section in which there is no permanent magnet 12 is reduced. In other words, the tooth 22 itself reduces a difference in magnetic resistance between when the tooth 22 passes under the permanent magnet 12 and when it passes through the section in which there is no permanent magnet 12. Therefore, regardless of whether the permanent magnet 12 is present or not, the variation rate (dR) of the magnetic resistance can be reduced in all of the rotating sections. As a result, the cogging torque ($T_C$) can be markedly reduced, whereby vibration and noise of the motor can be reduced.

As shown in FIG. 5, the cogging torque ($T_C$) resulting from the shape of the tooth 22 according to the present invention is reduced by 70% compared to that of the conventional rotator structure shown in FIGS. 1 and 2.

Each facing surface 23 of the tooth 22 has a planar shape and is formed to be inclined such that it forms a predetermined angle α relative to a tangent T at a point at which the inner circumferential surface of the permanent magnet 12 and the center line C of the stator core 21 intersect each other.

It is preferable that the angle α between each facing surface 23 of the tooth 22 and the tangent T satisfy 3°≤α≤20°. If the angle α is less than 3°, a rate of reduction in the magnetic resistance from the center of the tooth 22 to the opposite ends thereof is excessively reduced. In this case, there is a comparatively large difference between the magnetic resistance value on each end of the tooth 22 and the magnetic resistance value in the section in which there is no permanent magnet 12. Consequently, a rate of variation in magnetic resistance cannot be greatly reduced. If the angle α is greater than 20°, the difference between the magnetic resistance value on each end of the tooth 22 and the magnetic resistance value in the section in which there is no permanent magnet 12 is reduced, but there is a comparatively large difference in magnetic resistance between the center of the tooth 22 and the opposite ends thereof. As a result, a rate of variation in magnetic resistance of the tooth 22 itself is excessively increased.

In the case where the angle α is greater than 3° and less than 20°, the difference between the magnetic resistance value on each end of the tooth 22 and the magnetic resistance value in the section in which there is no permanent magnet 12 is satisfactorily reduced, and the rate of variation in magnetic resistance in the tooth 22 itself is also comparatively small. Consequently, the variation rate (dR) of the magnetic resistance in all of the sections can be minimized.

Another embodiment of the tooth 22 will be described with reference to FIG. 6.

Figure 6:
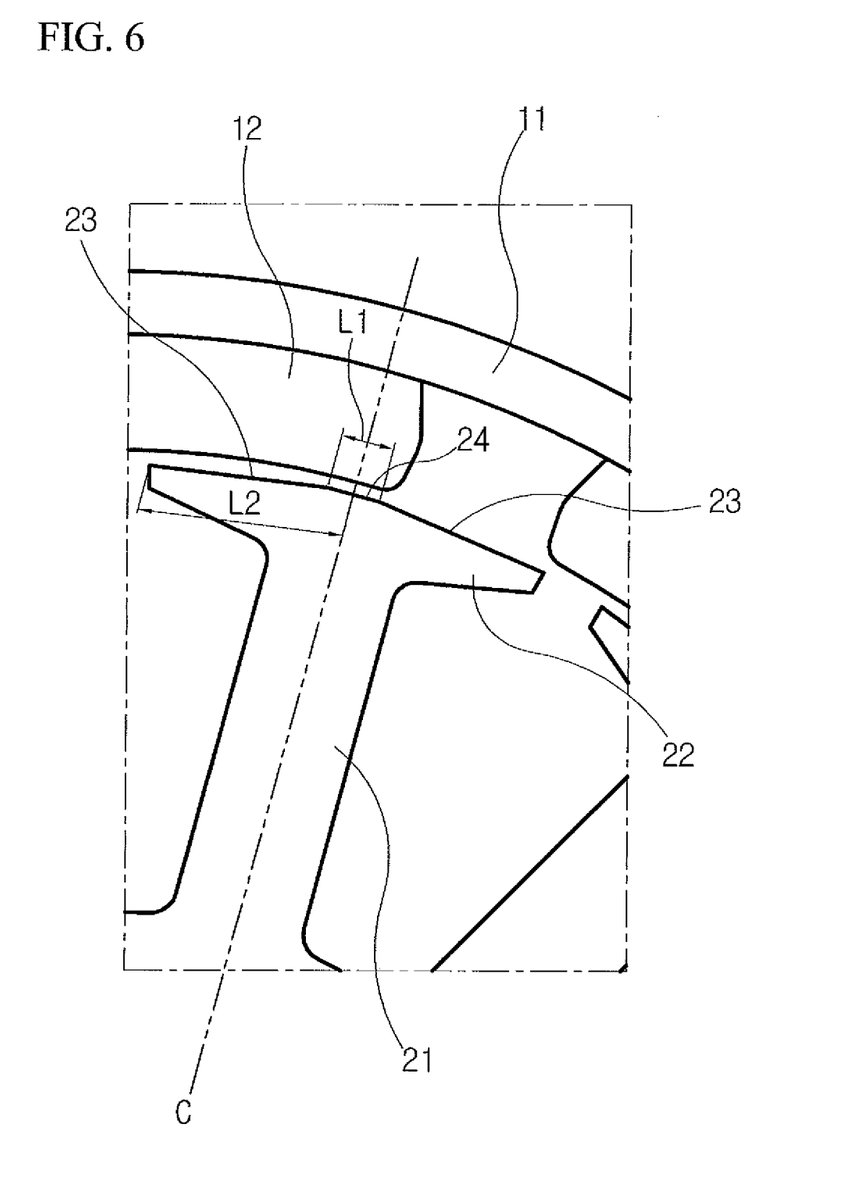
FIG. 6 is a partial enlarged view showing a tooth of a brushless motor according to another embodiment of the present invention.

As shown in FIG. 6, a top surface part 24 extending from the center line C of the stator core 21 in the opposite directions is formed on the facing surfaces 23 of each of the teeth 22. That is, the top surface part 24 is formed on the central portion of the tooth 22 on which the two symmetrical facing surfaces 23 are joined with each other.

The top surface part 24 shown in FIG. 6 may have a planar or curved shape. In the case where the top surface part 24 is planar, it may be formed to be perpendicular to the center line C. In the case where the top surface part 24 is curved, the curvature thereof may be the same as that of the permanent magnet 12.

Figure 7:
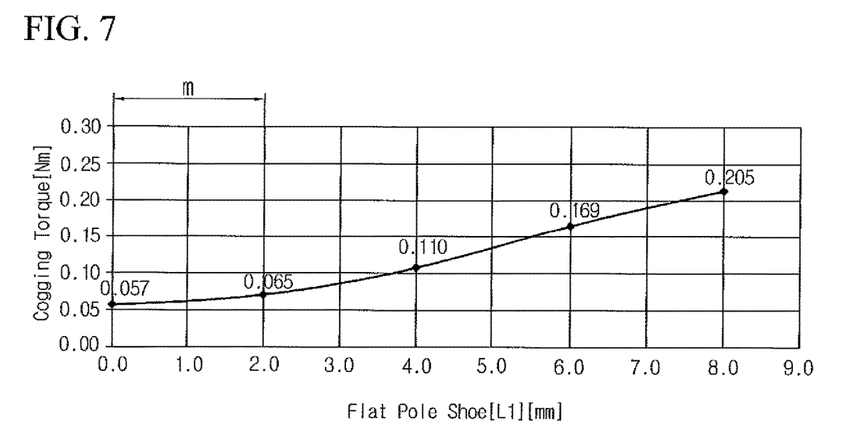
FIG. 7 is a graph showing the cogging torque of the brushless motor shown in FIG. 6.

The cogging torque of the motor varies depending on the length of the top surface part 24. FIG. 7 is a graph showing variation of the cogging torque depending on the length L1 of the top surface part 24 when a length L2 from the center line C to the end of the facing surface 23 is 10 mm (the entirety of the two facing surface is 20 mm). As shown in FIG. 7, as the length L1 of the top surface part 24 is increased, the cogging torque is also increased. Particularly, in a section m in which the length L1 of the top surface part 24 ranges from 0 mm to 2.0 mm, the variation rate of the cogging torque is comparatively low. In a section in which the length L1 is greater than 2.0 mm, the variation rate of the cogging torque is rapidly increased.

Therefore, it is preferable that the length L1 of the top surface part 24 relative to the length L2 from the center line C to the end of each facing surface 23 satisfy $$0 < \frac{L1}{L2} < \frac{1}{4}.$$

If the length L1 of the top surface part 24 relative to the length L2 is greater than ¼, variation of the cogging torque becomes comparatively large. In this case, deviation in performance of the motor is increased. If the length L1 of the top surface part 24 is zero, the tooth 22 has the same shape as that of the tooth 22 shown in FIG. 4.

As described above, in a brushless motor according to the present invention, a rate of variation in magnetic resistance in response to variation in position of a rotor can be minimized, whereby cogging torque can be markedly reduced.

Although the exemplary embodiments of the present invention have been disclosed for illustrative purposes, it will be appreciated that the present invention is not limited thereto, and those skilled in the art will appreciate that various modifications, additions, and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A brushless motor comprising:
    a rotor in which a permanent magnet is provided on an inner circumferential surface of a rotor core; and
    a stator in which a tooth is provided on an end of a stator core around which a coil is wound, wherein the tooth includes a facing surface which faces the permanent magnet, wherein a planar top surface part having a shape different from a shape of the facing surface is formed on the facing surface, the top surface part extending from a center line of the tooth in opposite directions therefrom, wherein a distance between the top surface part and an inner circumferential surface of the permanent magnet is substantially constant along the top surface part, wherein a distance between the facing surface and the inner circumferential surface of the permanent magnet is gradually increased from directly adjacent the top surface part to opposing ends of the facing surface, and wherein a slope of the facing surface from directly adjacent the top surface part to the opposing ends of the facing surface is constant.

2. The brushless motor according to claim 1, wherein the tooth extends in a circumferential direction of the rotor core.

3. The brushless motor according to claim 1, wherein the facing surface of the tooth has a planar shape and is formed to be inclined such that the facing surface forms a predetermined angle relative to a tangent at a point at which the inner circumferential surface of the permanent magnet and a center line of the stator core intersect each other.

4. The brushless motor according to claim 3, wherein the predetermined angle relative to the facing surface of the tooth and the tangent is 3° to 20°.

5. The brushless motor according to claim 3, wherein the facing surface of the tooth is symmetrical based on the center line of the stator core.

6. The brushless motor according to claim 5, wherein
a length L1 of the top surface part relative to a length L2 from the center line to each of the ends of the facing surface satisfies $$0 < \frac{L1}{L2} < \frac{1}{4}.$$

7. The brushless motor according to claim 5, wherein
a length L1 of the top surface part satisfies 0 mm≤L1≤2 mm.

8. The brushless motor according to claim 5, wherein the top surface part is perpendicular to the center line.

9. The brushless motor according to claim 3, wherein when a distance between the top surface part and the permanent magnet at the center line is denoted by d1 and a distance between the facing surface and the permanent magnet at one of the ends of the facing surface is denoted by d2, a relationship of d1<d2 is satisfied.

10. The brushless motor according to claim 1, wherein the inner circumferential surface of the permanent magnet has a concave curved shape, and the facing surface of the tooth has a planar shape.

11. The brushless motor according to claim 1, wherein the rotor is rotatably disposed outside the stator with respect to a radial direction of the stator.

12. The brushless motor according to claim 1, further comprising a cooling fan coupled to the rotor.

13. The brushless motor according to claim 12, wherein the rotor is mounted to a hub of the cooling fan.

* * * * *